United States Patent
Klar et al.

[11] 3,882,848
[45] May 13, 1975

[54] TEST PROBE FOR AN IMPEDANCE AUDIOMETER

[75] Inventors: Irwin Klar, New City; Erwin H. Rock, Ardsley, both of N.Y.

[73] Assignee: American Electromedics Corporation, Dobbs Ferry, N.Y.

[22] Filed: Jan. 24, 1974

[21] Appl. No.: 436,105

[52] U.S. Cl. ............... 122/2 Z; 179/1 N; 73/67.1; 181/.5 G
[51] Int. Cl. .............................. A61b 10/00
[58] Field of Search ........... 128/2 Z, 2 R, 152, 151; 179/1 N; 73/69, 67.1; 181/.5 G

[56] References Cited
UNITED STATES PATENTS

| | | | |
|---|---|---|---|
| 2,415,310 | 2/1947 | Summervill et al. | 128/2 Z |
| 2,900,039 | 8/1959 | Burnett | 73/69 |
| 3,131,241 | 4/1964 | Mendelson | 128/151 |
| 3,295,513 | 1/1967 | Dippolito | 128/2 Z |
| 3,395,697 | 8/1968 | Mendelson | 128/2 Z |
| 3,565,069 | 2/1971 | Miller | 128/152 |
| 3,757,769 | 9/1973 | Arguimbau et al. | 128/2 Z |

Primary Examiner—Richard A. Gaudet
Assistant Examiner—Lee S. Cohen
Attorney, Agent, or Firm—Holland, Armstrong, Wilkie & Previto

[57] ABSTRACT

An improved test probe is disclosed for use in a clinical evaluation of hearing loss. There are a number of increasingly important acoustic impedance tests for providing an evaluation of hearing system losses which involve the use of impedance audiometry measurements in patients' external ear canals. A probe is described for use in these tests which is inserted in the patient's ear and which includes a number of tubes for transmitting audio signals and air for the tests. The inner end of the probe is constructed to assure a satisfactory closed test cavity of adequate size in the ear canal and to form an air-tight seal for the closed cavity using a cooperating resilient cuff.

7 Claims, 6 Drawing Figures

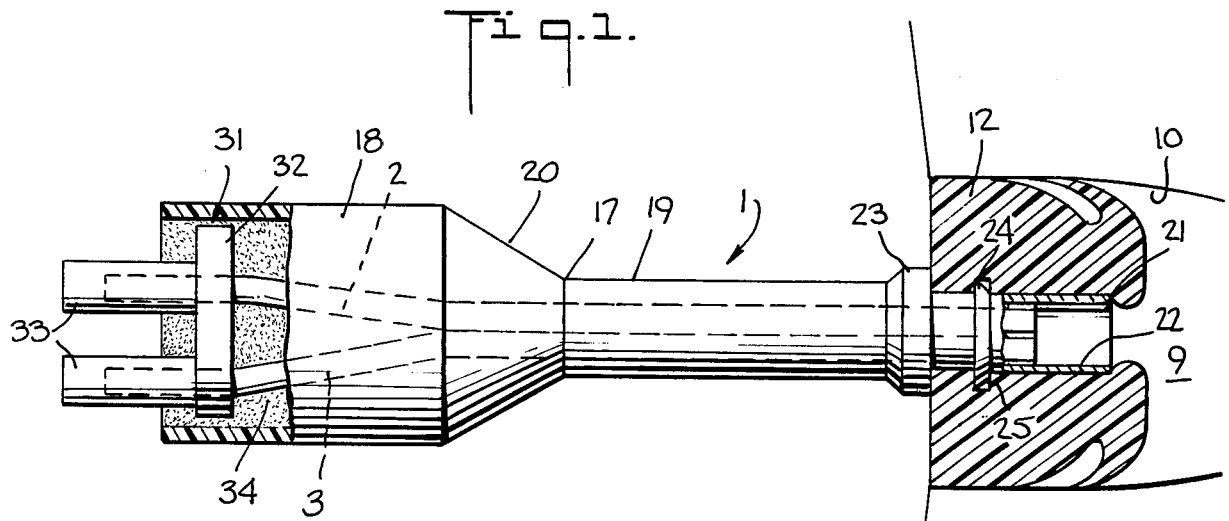
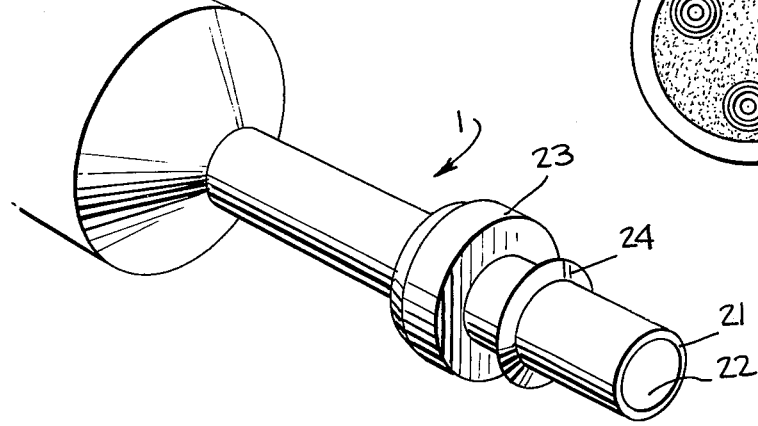
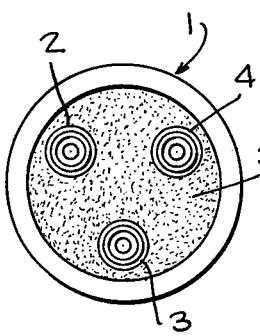
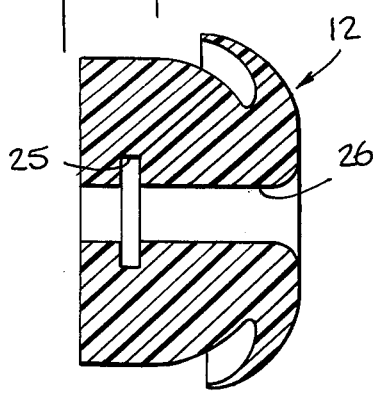
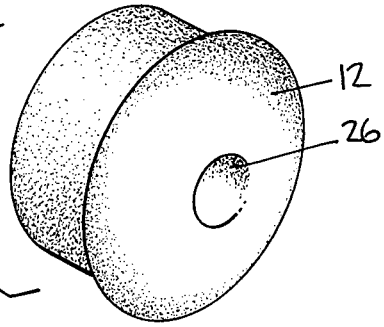
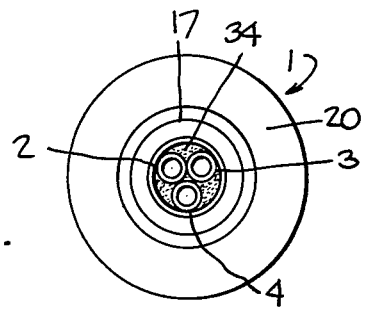

TEST PROBE FOR AN IMPEDANCE AUDIOMETER

BACKGROUND OF THE INVENTION

The present invention relates to clinical evaluating of hearing loss and more particularly to an improved probe for use with acoustic impedance test equipment.

An important test procedure for evaluating hearing losses is known as Acoustic Impedance Testing or Impedance Audiometry. These tests procedures are based upon certain acoustical measurements made within the patient's outer ear canal and include the step of closing off the inner portion of the canal adjacent to the patient's tympanic membrane with a probe which simultaneously forms the necessary seal while permitting a control of the air pressure within the sealed cavity and the transmission to and receipt of sound signals from the closed cavity.

The auxiliary equipment for these tests is known and it has been used heretofore with certain probes for accomplishing the above results. The probe of the present invention has an improved arrangement of its several inner elements which result in a more precise and more reliable test result particularly in the case of children and certain other patients with ear canals differing from the norm. In particular, the improved probe assures the formation of an effective sealed cavity of adequate size adjacent to the ear tympanic membrane regardless of the configuration of the particular ear canal under test.

Accordingly, an object of the present invention is to provide improved equipment for clinical evaluations of hearing losses and more particularly for providing improved probes for acoustic impedance testing.

Another object of the present invention is a probe for impedance audiometry which assures the creation of a sealed cavity within an ear under test of adequate size.

Another object of the present invention is to provide an improved probe for the air pressure and audio signal tubes of impedance audiometer equipment.

Another object of the present invention is an improved cuff mounting and tube end arrangement for an acoustic impedance test probe.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing forming a part of the specification, wherein:

FIG. 1 is a side elevational view partially in section of an improved probe in accordance with the present invention;

FIG. 2 is a perspective view of the inner end of the probe and a preferred cuff for use with the probe;

FIG. 3 is an end view of the outer end of the probe of FIG. 1;

FIG. 4 is an end view of the inner end of the probe of FIG. 1;

FIG. 5 is a sectional view of the cuff of FIG. 1; and

DESCRIPTION OF THE PREFERRED EMBODIMENT

Figure 6:
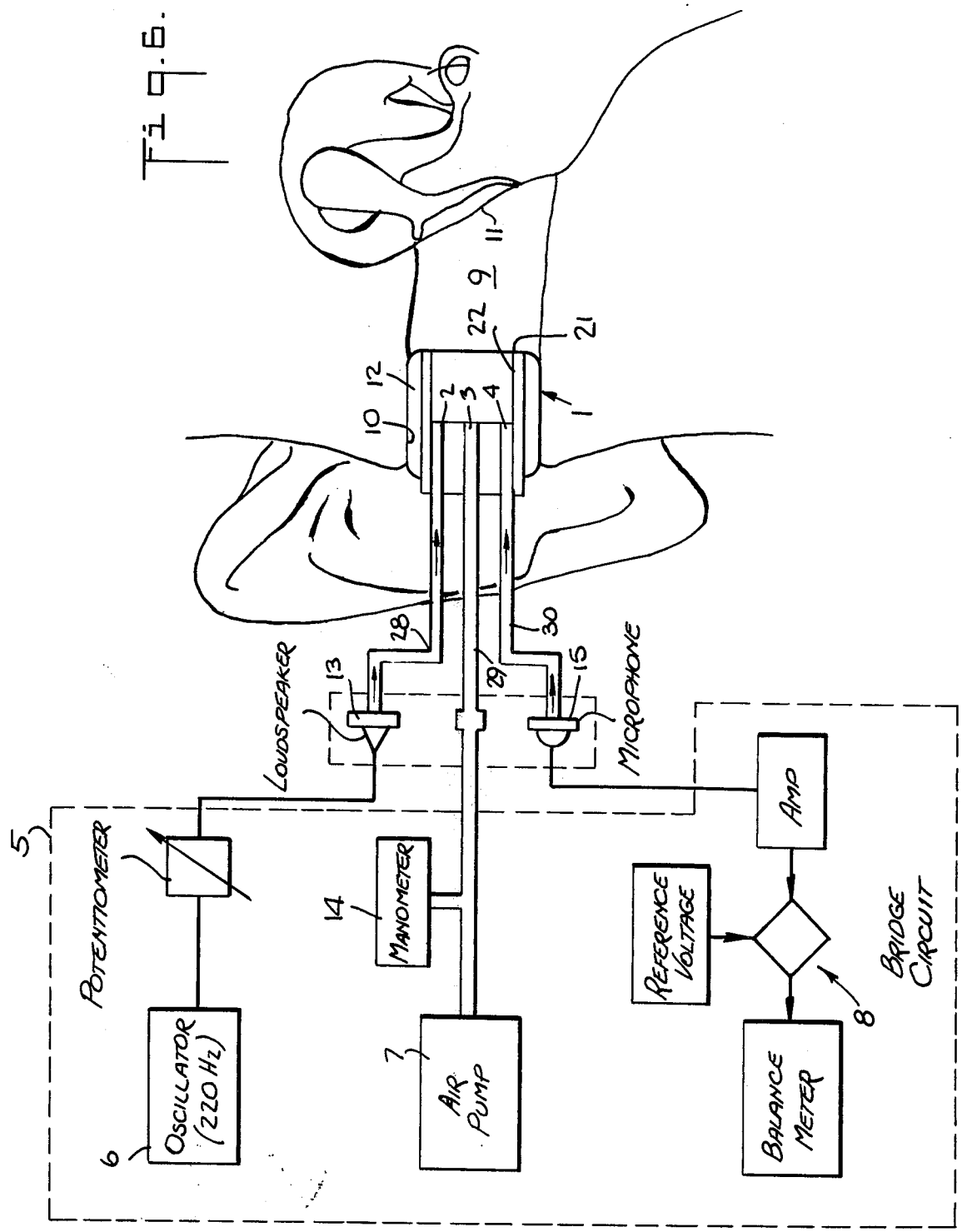
FIG. 6 is a diagrammatic view illustrating a test arrangement for a typical acoustic impedance test using a probe in accordance with the present invention.

As noted above, this invention relates particularly to an improved probe as used in performing a number of acoustic impedance tests in connection with a clinical evaluation of hearing losses. The initial portion of the following description will cover such impedance tests in a very general way, particularly with reference to FIG. 6, for providing a background for the description of the probe and its improved features. The invention does not relate to the overall tests or test equipment independently of the probe since these tests and equipment are already known.

The improved probe 1, which will be described with particular reference to FIGS. 1 through 5, is used in acoustic impedance tests, the set up for which is illustrated diagrammatically in FIG. 6.

FIG. 6, for example, illustrates an arrangement of test equipment which may be used to perform a test known as Tympanometry. This test uses a probe 1 in accordance with the invention including three transmitting tubes 2, 3 and 4 for coupling an impedance audiometer 5 including oscillator 6, an air pump 7 and a signal response measuring device in the form of an acoustic bridge 8 to a closed-off cavity 9 within the patient's outer ear canal 10. Thus, FIG. 6 illustrates a probe 1 in accordance with the present invention inserted into the patient's ear canal 10 so that it closes off and hermetically seals the cavity 9 within the canal 10 and adjacent to the tympanic membrane 11. A resilient cuff 12 on the probe 1 is positioned on the inner end of the probe 1 for forming an air-tight or hermetic seal with the canal 10 walls.

The test which is performed includes the transmission of a sound signal wave of a predetermined frequency and volume from the oscillator 6 and loud speaker 13 through one of the probe tubes 2 to the sealed-off cavity 9. Important phases of the testing involve the supply of this sound to the cavity 9 with the tympanic membrane 11 being stressed or conditioned by the adjustment of the air pressure within the sealed cavity 9 by means of the air pump 7 and a manometer 14. This air source is coupled to the sealed cavity 9 through the second tube 3 within the probe 1. This testing, known as Tympanometry, is an objective method for evaluating the mobility of the tympanic membrane 11 as well as the functional condition of the patient's middle ear. The tympanometric measurements are made for determining ear drum compliance changes as the air pressure is altered within the sealed cavity 9. These changes are measured by use of the third tube 3 within the probe 1 which conducts sound signals from the cavity 9 to a microphone 15 and then to the measuring bridge 8.

The probe 1 performs the initial functions of sealing off a cavity 9 within the ear canal 10 of appropriate volume and of also coupling the several transmission tubes 2, 3 and 4 to this cavity 9 while the cavity 9 air pressures are adjusted for the tests.

In addition to the above test known as Tympanometry, probes 1 also are used in a generally similar way for forming cavities 9 with varying air pressures for Static Compliance Testing and for Acoustic Reflex Threshhold tests. In the Static Compliance Test, which measures the middle ear system mobility, a condition of the testing also requires a setting and an adjustment of air pressure within the sealed off ear canal cavity 9 in the manner already described. Similarly, the use of the probe 1 to form the cavity 9 and an adjustment of air pressure during testing is also required for the Acoustic Reflex Threshhold testing where a reflexive contraction of the ear stapedial muscle is monitored during an adjustment of an acoustic test signal.

THE IMPROVED PROBE

FIGS. 1-4 illustrate a preferred embodiment of the probe 1. The probe 1 comprises an outer casing 17 including an enlarged outer end coupling portion 18 which is connected to a more slender central portion 19 by a flared section 20. The central portion 19 has an inner end 21 including an open end cavity 22 provided between the inner ends of the tubes 2, 3 and 4 and the inner probe end 21. This cavity 22 will be further discussed below.

A cuff positioning flange 23 is provided outwardly of the inner end 21 of the probe 1 for acting as a stop and positioner for the outer surface of the resilient cuff 12. An outwardly extending beveled anchoring flange 24 is attached to the casing 17 between the cuff positioning flange 23 and the probe end 21 for releasably anchoring the cuff 12 in place on the probe 1. The preferred crosssection of this flange has a beveled outer edge for facilitating the cuff placement in cooperation with a complementary slot 25 formed in the central aperture 26 of the cuff 12.

The outer end of the probe 1 is made so that the ends of tubes 2, 3 and 4 may be attached to connecting tubes 28, 29 and 30 (FIG. 6) by one or more suitable coupling plugs. For this purpose, a header 31 is positioned within the enlarged end 18 of the casing including an embedded flange portion 32 having a cylindrical socket portion 33 attached thereto for receiving and for positioning each of the ends of tubes 2, 3 and 4 for making them available to a coupling plug or tube. The space between each of the tubes 2, 3 and 4 and the surrounding casing 17 is filled with a potting and insulating compound 34. The tubes 2, 3 and 4, which are illustrated as three in number for the probe being described, extend from the header 31 through the probe 1 toward the opposite or inner end 21 where they terminate a predetermined distance short of the inner end 21 of the probe 1. The potting material 34 which insulates and supports and positions the hollow tubes 2, 3 and 4 within the probe fills the probe 1 in the zone between the tube walls and the inner walls of the probe 1 but terminates at the inner end 21 at the inner ends of the tubes 2, 3 and 4 at the cavity 22.

FIG. 1 illustrates the preferred inner end design. In this design, the cuff 12 is proportioned to extend slightly beyond the inner end 21 of the probe 1 to provide a protective resilient inner surface for the assembled cuff 12 and probe 1. The cuff 12 is seen to be tightly mounted on the inner end 21 of the probe 1 with its anchoring slot 25 engaging the anchoring flange 24 on the probe 1. The three coplanar inner ends of the tubes 2, 3 and 4 are spaced a predetermined and significant distance from the inner end 21 of the probe 1 itself.

The above referred to testing requires a minimal size cavity 22 within the patient's ear canal 10 between the ends of the tubes 2, 3 and 4 and the tympanic membrane 11. Since there are significant variations in the depths of patient's outer ear canals and the exact positioning of the tympanic membranes 11 within the canals, the above described tube end spacing assures the creation of a cavity including cavity 22 of acceptable size for the various acoustic impedance tests. In order to assure a test cavity of acceptable size, the cavity 22 is preferably given an axial dimension of about 0.10 to 0.20 inches where the circumference of the cylindrical probe end 21 may be about 0.15 inches. This assures the creation of a cavity 22 giving reliable responses when the cavity 22 is pressurized for the various acoustic impedance tests.

It will be seen that an improved probe is provided for a clinical testing of hearing loss. The probe of this invention provides for improved testing in a number of acoustic impedance tests where a common feature of the test is the formation of a closed cavity within the patient's external ear canal. The improved probe assures the creation of a sealed cavity of appropriate size regardless of the patient's specific ear canal shape thereby giving reliable results for those tests which include the step of increasing the air pressure within the sealed cavity using the improved probe.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:
1. An improved ear test probe for use in evaluating hearing losses comprising the combination of:
    a hollow casing including an open inner end portion for insertion into a patient's outer ear canal,
    means at the casing inner end to seal the casing and said outer ear canal,
    a plurality of hollow tubes extending through said casing from an outer end,
    potting material within said casing and surrounding said tubes, and
    said hollow tubes having inner ends spaced inwardly from the inner end of said casing whereby a substantial cavity is provided at the inner end of said probe between said tube ends and said casing inner end.
2. The probe as claimed in claim 1 which further comprises means for attaching said sealing means to said probe comprising a first projecting flange having a planar surface normal to the axis of said probe and spaced outwardly of the inner end of said probe, and a locking flange projecting outwardly of said probe container at a position intermediate of said first named flange surface and the said inner end of said probe.
3. The probe as claimed in claim 1 which further comprises coupling means for the outer ends of said tubes comprising a header member engaging said tubes and being embedded in said potting material.
4. An improved ear test probe for use in evaluating hearing losses comprising the combination of:
    a hollow casing including a circular open inner end portion of relatively small diameter,
    means at the casing inner end portion to form a seal with an ear under test,
    said casing having an outer end portion of relatively greater diameter, a plurality of hollow tubes extending through said casing from said outer end to a point spaced from said inner end, potting material within said casing and surrounding said tubes, means at said inner end of said casing extending outwardly from said casing for releasably engaging said sealing means, and said tubes having their ends adjacent the inner end of said casing in a common transverse plane with said plane being positioned inwardly of the open inner end of said casing whereby a substantial cavity is provided at the inner end of said probe between said tube ends and said casing inner end.

5. The probe as claimed in claim 4 in which said means for engaging said sealing means comprises a first projecting flange having a planar surface normal to the axis of said probe and spaced outwardly of the inner end of said probe, and a locking flange projecting outwardly of said probe container at a position intermediate of said first named flange surface and the said inner end of said probe.

6. The probe as claimed in claim 4 which further comprises coupling means for the outer ends of said tubes comprising a header member engaging said tubes and being embedded in said potting material.

7. An improved ear test probe for use in evaluating hearing losses comprising the combination of:

a hollow casing including a cylindrical open inner end portion of relatively small diameter, means at the casing inner end portion to form a seal with an ear under test, said casing having a cylindrical outer end portion of relatively greater diameter, a cylindrical connecting portion coupling said end portions, a plurality of hollow tubes extending through said casing from said outer end to a point adjacent to said inner end, potting material within said casing and surrounding said tubes, means at said inner end of said casing extending outwardly from said casing for releasably engaging said sealing means, and said tubes having their ends adjacent the inner end of said casing in a common transverse plane with said plane being positioned inwardly of the open inner end of said casing a distance about as great as said inner end diameter whereby a substantial cavity is provided at the inner end of said probe between said tube ends and said casing inner end.

* * * * *